United States Patent [19]
Koci

[11] 3,940,671
[45] Feb. 24, 1976

[54] CONTROL CIRCUIT FOR AMUSEMENT DEVICE

[75] Inventor: Jerry C. Koci, Barrington, Ill.

[73] Assignee: Chicago Dynamic Industries, Inc., Chicago, Ill.

[22] Filed: Aug. 12, 1974

[21] Appl. No.: 496,390

[52] U.S. Cl............................. 318/349; 318/249 X
[51] Int. Cl.²......................................... H02P 5/30
[58] Field of Search................... 318/249, 271, 349

[56] References Cited
UNITED STATES PATENTS

| | | |
|---|---|---|
| 2,131,588 | 9/1938 | Gray............................ 318/249 X |
| 2,663,835 | 12/1953 | Willby............................. 318/249 |
| 2,974,268 | 3/1961 | Blake et al...................... 318/349 |
| 3,021,465 | 2/1962 | Garten......................... 318/271 X |
| 3,716,768 | 2/1973 | Mason............................. 318/349 |
| 3,757,186 | 9/1973 | Ozawa........................ 318/349 X |

Primary Examiner—Gene Z. Rubinson
Attorney, Agent, or Firm—Edward C. Threedy

[57] ABSTRACT

An operating control circuit for an amusement device of the simulated driving type, wherein the speed of the simulated vehicle is regulated by an operator-controlled accelerator and a gear shift, each electrically arranged to cooperate and interrelate so as to respond to the manual skills and ability of the operator.

4 Claims, 4 Drawing Figures

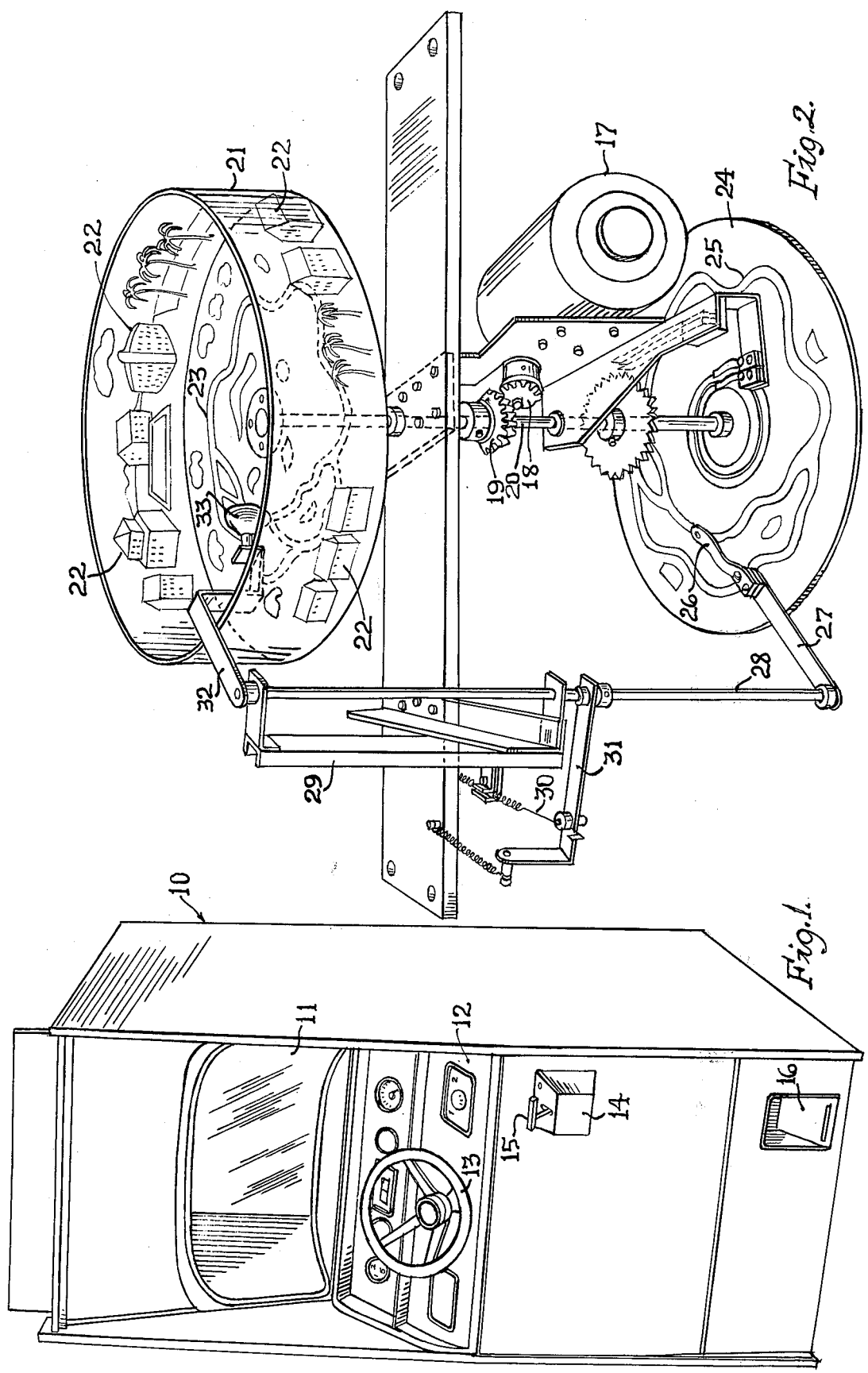

CONTROL CIRCUIT FOR AMUSEMENT DEVICE

SUMMARY OF THE INVENTION

This invention relates to a speed control system for use in an amusement device of the simulated driving type as shown and described in the assignee's U.S. Letters Pat. Nos. 3,568,332 and 3,583,079.

As described in the aforementioned patents, there is a simulated condition created in which the operator of the amusement device appears to drive a vehicle in a time/speed competitive situation along a tortuous roadway. Simulated accidents, such as collisions or loss of control of the simulated vehicle created through the operator's inability to control both the simulated path and the speed of the driven vehicle, will result so as to affect both the time of driving and total speed of the operator's vehicle over the simulated roadway course.

By the present invention the operator is afforded a dual speed control related to his simulated vehicle and its movement over the roadway and its motion in relation to other vehicles and/or obstacles. The operator manually controls an accelerator as well as a gear shift lever, each of which is electrically interconnected to control the apparent driving speed of the operator's vehicle. All of the desired effects are accomplished through the circuitry hereinafter described and claimed.

The invention is best understood by reference to the accompanying drawings illustrating the best mode of carrying out the invention, and in which:

FIG. 1 is a perspective view of the amusement game apparatus;

FIG. 2 is a perspective view of the operating components of the apparatus;

Figure 4:
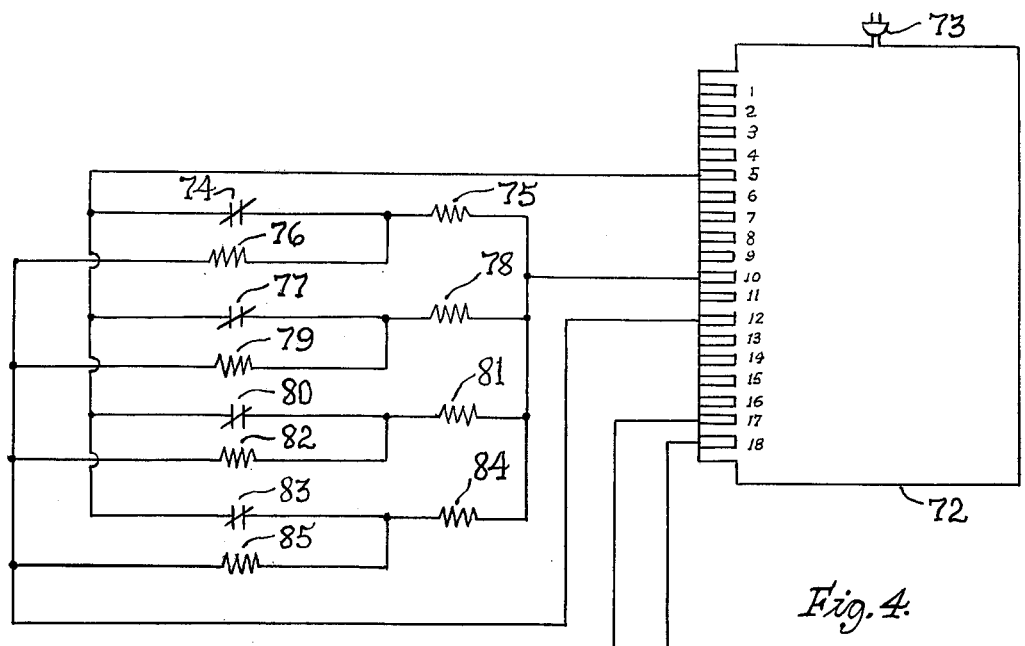
FIG. 4 is a schematic view of a sound control circuit.

As illustrated in FIG. 1, the amusement apparatus consists of a cabinet 10 having a windshield type transparent screen 11, a dashboard 12 having positioned thereover a movable steering wheel 13 as well as a gear box 14 with a movable gear shift lever 15 and a foot-operated accelerator pedal 16.

Within the cabinet 10 is the mechanism for creating the illusion of movement including, in part, an electric motor 17, the driven shaft of which rotates, in either direction, a bevel gear 18 which in turn meshes with and rotates with a second bevel gear 19 fixedly connected to an elongated shaft 20.

The elongated shaft 20 has fixedly connected thereto at its upper end a transparent drum 21. The bottom and peripheral walls of the drum 21 have printed thereon a series of transparencies 22 which when illuminated project upon the transparent windshield type screen 11 in the line of sight of the operator of the apparatus. One of the transparencies 23 comprises a tortuous path that represents a winding roadway over which the simulated automobile is to be moved.

Fixedly connected to the lower end of the shaft 20 and rotatable therewith, is a disc 24. On one face of the disc 24 is printed an electrically conductive path 25 that is identical to the tortuous path 23 printed on the drum 21. A stylus or switch finger 26 is carried at one extremity of an arm 27 which in turn is fixed to one end of an elongated rod 28. The rod 28 is rotatably carried by a bracket 29 and is caused to rotate through the movement of a bowden wire 30, which has one end connected to an arm 31 connected to the rod 28. The opposite end of the bowden wire 30 moves in response to the rotational movement of the steering wheel 13 in either direction.

Connected to the upper end of the rod 28 and movable therewith is a support 32 which in turn positions a light bulb 33 within the drum 21. These parts and their function are fully described in the aforementioned patents and, as such make up no part of the present invention.

Figure 3:
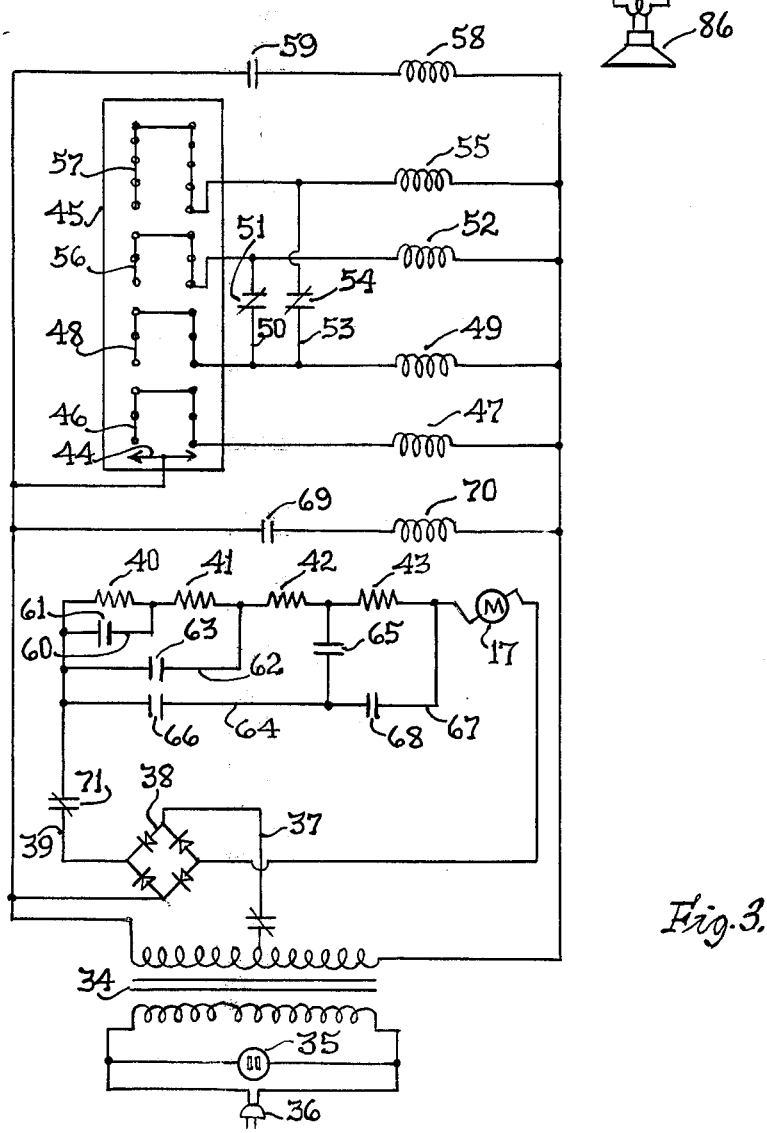
FIG. 3 is a schematic circuit diagram of the speed control circuit of the apparatus.

In order to control the rotational speed of the drum 21 and disc 24 to create the effect of different driving speeds, there is provided an electric circuit such as shown in FIG. 3. In the electric circuit there is a transformer 34, the primary side of which includes a socket 35 and a connector plug 36. The secondary side of the transformer 34 through a line 37 is connected to a diode rectifier 38 having an output line 39. The line 39 connects in series a number of resistors 40, 41, 42 and 43 as well as the electric motor 17.

The accelerator pedal 16 moves a wiper arm 44 over an accelerator disc 45. The accelerator disc 45 provides a first set of interconnected contacts 46 which are in circuit with a first speed relay 47. The accelerator disc 45 provides a second set of interconnected contacts 48 which are in turn connected to a second speed relay 49. A third set of contacts 56 are connected to the third speed relay 52, while a fourth set of contacts 47 on the accelerator disc 45 are connected to the fourth speed relay 55. Switches 51 and 54 are in circuit between the third and fourth set of contacts 46 and 57 and a second speed relay 49, and are normally closed when their relays 47 and 49 are deenergized. These switches 51 and 54 function to maintain selective energization of the relays 49, 52 and 55 to insure continuous energization of the motor 17.

The circuit also includes a gear shaft relay 58 and a gear shift switch 59 that is controlled through the manual actuation of the gear shift lever 15.

The speed of the motor 17 is regulated by shunting certain of the resistors 40 through 43. To shunt these resistors there is provided the following circuit: A shunt circuit 60 including a normally open first speed relay switch 61 shunts the resistor 40, while a second shunt circuit 62 including a normally open second speed relay switch 63 is designed to shunt resistors 40 and 41. A shunt circuit 64 includes a normally open third speed relay switch 65 as well as a gear shift relay switch 66. This circuit shunts resistors 40, 41 and 42. The last shunt circuit 67, which includes a normally open fourth speed relay switch 68, is designed to shunt all of the resistors 40 through 43.

In operation, when the device is conditioned to be operated, the driver, upon depressing the accelerator pedal 16, causes the accelerator wiper arm 44 to engage the first set of contacts 46. This in turn will energize the first speed relay 47, which in turn will close relay switch 61. The closure of the first speed relay switch 61 shunts resistor 40 and permits sufficient current into the motor 17 so as to commence the rotation of the drum 21 and the disc 24 by the motor 17.

As the player increases the depression of the accelerator pedal 16, the wiper arm 44 will move onto the second, third, or fourth set of contacts. As the wiper arm 44 moves onto the second set of contacts 48, the second speed relay 49 is energized, and this will close its relay switch 63 in the shunt circuit 62, so as to shunt resistors 40 and 41, increasing the current to the motor 17. Regardless of further depression of the accelerator pedal 16 and the further movement of the wiper arm 44 over the accelerator disc 45, this is the top speed of rotation of the drum 21 and disc 24 until the player operates the gear shift lever 15 so as to close the gear shift switch 59 and energizing the gear shift relay 58. The energization of the gear shift relay 58 will close the gear shift relay switch 66, which is in the shunt circuits 64 and 67.

As the wiper arm 44 engages the third set of contacts 56 so as to engage the third speed relay 52, its respective relay switch 65 will be closed to effectively shunt resistors 40, 41 and 42 so as to increase the energization of the motor 17.

As the wiper arm 44 engages the fourth set of contacts 57, the fourth speed relay 55 will be energized, closing its respective relay switch 68 and effecting through the shunt circuit 67 an unrestricted circuitry to the motor 17, effectively shunting all of the resistors 40 through 43 so as to operate the motor 17 at its full capacity.

In the event that the driver of the simulated automobile has a collision or other type of accident, wherein the stylus or switch arm 26 moves off the conductive path 25 on the disc 24, such action will result in the closing of a normally open switch 69 that in turn will energize the crash relay 70, which in turn will open a relay switch 71 in line 39 to the motor circuit, so as to deenergize the motor 17.

Included in the electric circuit and to enhance the interest in the use of the apparatus, and to create an aura of authenticity, there is included in the circuit a solid state sound system, such as shown in FIG. 4, which includes a solid state sound board 72. This sound board 72 through the electrical plug 73 when fitted into the socket 35, is connected with the motor control circuit. The sound board 72 includes in its circuitry a first speed relay switch 74 in series with a resistor 75 and in parallel with a second resistor 76. A second speed relay switch 77 which likewise is in series with a resistor 78 and in parallel with a second resistor 79, a third speed relay switch 80 in series with a resistor 81 and in parallel with a second resistor 82, and a fourth speed relay switch 83 in series with a resistor 84 and in parallel with a second resistor 85. When in normal condition, the resistors 75 and 76, 78 and 79, 81 and 82, 84 and 85, are connected in series so as to produce an insufficient voltage onto the sound board 72 to produce any sound.

As the accelerator wiper arm 44 engages the different sets of contacts 46, 48, 56 and 57, and in turn energizes the different speed relays 47, 49, 52 and 55, they in turn will effect appropriate closing of these relays' respective relay switches 74, 77, 80 and 83, to selectively shunt the resistors 76, 79, 82 and 85 that are in parallel with such switches, to increase the voltage onto the sound board 72, so as to produce through its speaker 86 any desired sound, such as that of increased motor vibration and motor acceleration sounds.

From the foregoing, it is apparent that I have devised a control circuit for an amusement device whereby the accomplishment of playing the amusement apparatus depends upon the skill and dexterity of the operator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desired to protect by Letters Patent is:

1. A speed control system for use in an amusement device of the simulated driving type, including
   a. an electric motor,
   b. a circuit for energizing the motor,
   c. a plurality of resistors connected in series in said circuit for the motor, normally restricting an operating current to the motor,
   d. a plurality of relay switches connected in parallel, with certain of said relay switches in open shunt circuits with respect to certain of said resistors,
   e. a plurality of relays for activating said relay switches in the circuit for energizing the motor,
   f. means for selectively energizing said relays so as to close their respective said relay switches to shunt one or more of said resistors so as to increase the energizing current to the motor, and
   g. manually operated means for controlling the energization of certain of said relays by said means for selectively energizing said relays to render said relay switches of said certain relays ineffective to close a shunt circuit with respect to certain of said resistors.

2. A speed control system as defined by claim 1 wherein said means for selectively energizing said relays comprises a wiper arm movable over a plurality of switch contacts in circuit with said relays for selectively energizing said relays so as to close their respective relay switches to shunt one or more of said resistors.

3. A speed control system as defined by claim 1 wherein said manually operated means comprises a manually operable switch having an open and closed condition including a relay and a relay switch in circuit with certain of said relay switches so as to render ineffective certain of said relay switches to close said shunt circuits with respect to certain of said resistors when said manually operable switch is in its open condition.

4. A speed control system as defined by claim 3 wherein said means for selectively energizing said relays comprises a wiper arm movable over a plurality of switch contacts in circuit with said relays for selectively energizing said relays so as to close their respective relay switches to shunt one or more of said resistors.

* * * * *